March 4, 1958 R. A. HENLE 2,825,889
SWITCHING NETWORK
Filed Jan. 3, 1955

INVENTOR.
ROBERT A. HENLE
BY
[signature]
ATTORNEY 2,825,889

SWITCHING NETWORK

Robert A. Henle, Hyde Park, N. Y., assignor to International Business Machines Corporation, New York, N. Y., a corporation of New York Application January 3, 1955, Serial No. 479,294

1 Claim. (Cl. 340—166)

The present invention relates to switching networks, and particularly to a network for producing an output condition or signal selectively at any of a plurality or even a large multiplicity of output terminals.

Switching networks of the type described herein are utilized in many complex electrical circuits, including high speed digital computers. A typical example of a use to which said networks may be put is in producing signals in a timed sequence at a large number of output locations, one location at a time.

An object of the present invention is to provide an improved switching network of the type described.

Another object is to provide a switching network of the type described utilizing transistor stages for the switching operation.

Another object is to provide, in a switching network having a plurality of outputs arranged in rows and columns, improved means for producing an output signal selectively at any of said outputs.

The foregoing and other objects of the invention are attained by providing a matrix comprising a plurality of rows of transistor stages, each row including a row drive line and a plurality of columns of transistor stages, each column including a column drive line. At the intersection of each row and column is a transistor inverter stage having two inputs, one connected to a row drive line and the other connected to a column drive line. The inverter stage produces a signal at its output only when signals are received simultaneously at both its inputs. The row drive lines are driven by transistor emitter follower stages, and the column drive lines are driven by inverter stages similar to those located at the row and column junctions. By simultaneously sending a signal through one row drive line and one column drive line, the particular inverter stage at the intersection of those lines may be caused to produce an output signal.

Other objects and advantages of the invention will become apparent from a consideration of the following specification and claims, taken together with the accompanying drawings.

Figure 1:
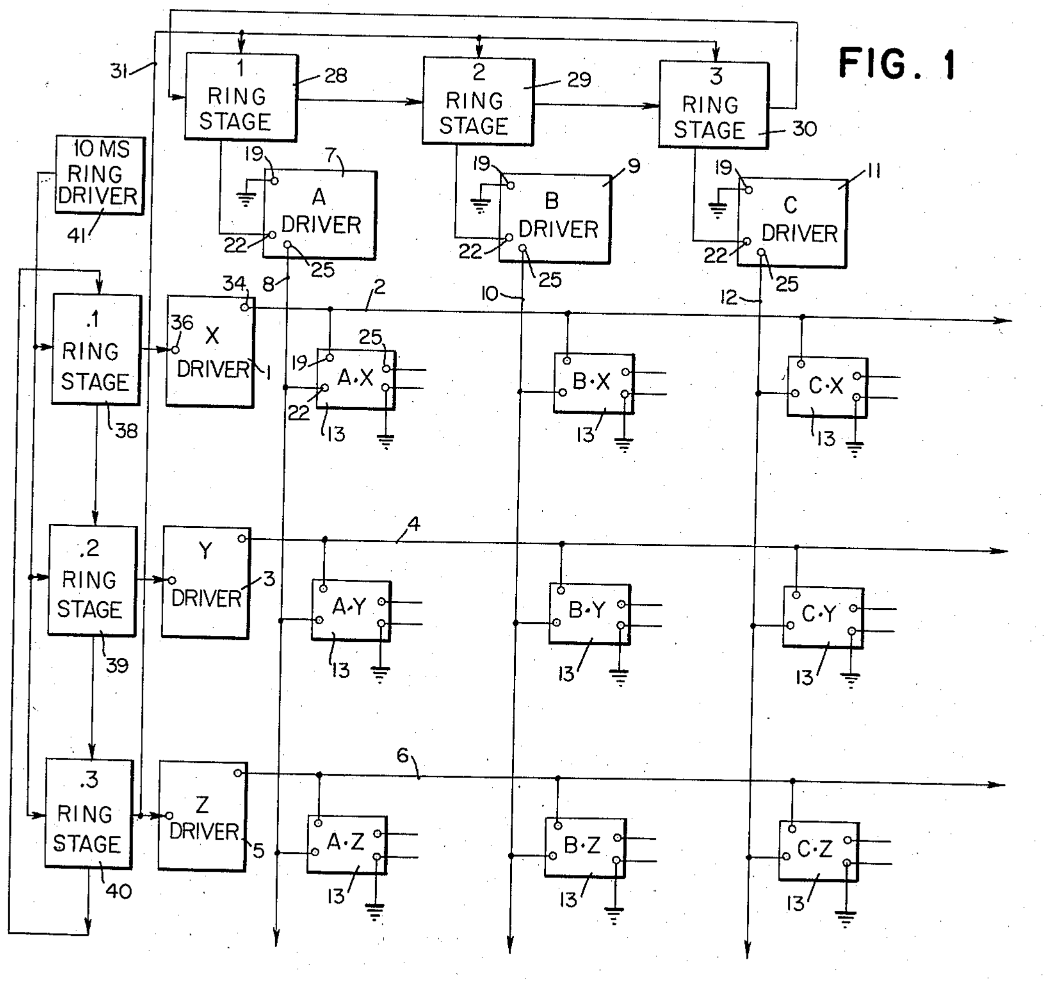
Fig. 1 is a somewhat schematic wiring diagram of a switching network constructed in accordance with the present invention.

Referring to Fig. 1, there is shown a network consisting of three rows, hereinafter referred to as the X, Y and Z rows, and three columns, referred to as the A, B and C columns. This particular number of rows and columns is selected for convenience of illustration only, and the invention is not limited to the use of any specific number of rows or columns. A large number of rows and columns may be used, or a network may comprise a single row or a single column. Furthermore, the rows illustrated in the circuit of Fig. 1 may be columns, and the columns may be rows. The two designations are used simply to clarify the explanation of the invention.

The X row includes a driving stage generally indicated by the reference character 1 and having an output connected to an X row drive line 2. The Y row similarly includes a driving stage 3, having an output connected to a Y drive line 4, and the Z row includes a driving stage 5 having an output connected to a Z row drive line 6.

The A column includes a driving stage 7 having an output connected to an A column drive line 8. The B column includes a driving stage 9 having an output connected to a B column drive line 10. The C column includes a driving stage 11 having an output connected to a C column drive line 12.

At the intersection of each row and column is located a logical circuit which is hereinafter termed a junction stage. The junction stages for all the rows and columns are identical and are identified by the reference numeral 13, preceded by an alphabetical designation representing the particular row and column to which the junction stage is connected. For example, the stage at the intersection of the X row and the A column is referred to as the junction stage AX13.

Figure 2:
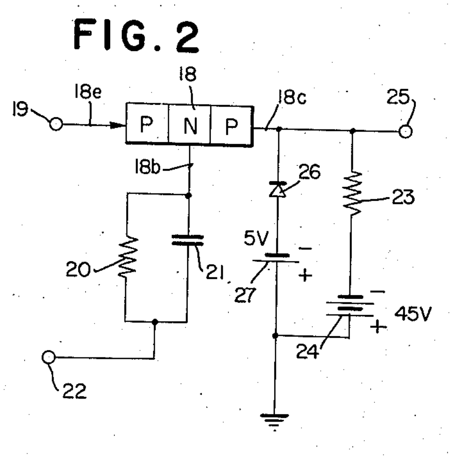
Fig. 2 is a wiring diagram of an inverter circuit which is used in the network of Fig. 1.

Each of the junction stages 13, and each of the column driving stages 7, 9 and 11 comprises an inverter of the type shown and described in detail in the copending application of George D. Bruce and Robert A. Henle, Serial No. 459,322, filed September 30, 1954. Such an inverter is shown in detail in Fig. 2 of the present application. As there shown, the inverter comprises a PNP junction transistor 18 having an emitter electrode 18*e*, a base electrode 18*b*, and a collector electrode 18*c*. Emitter electrode 18*e* is connected to an input terminal 19. Base electrode 18*b* is connected through a resistor 20 and a parallel capacitor 21 to an input terminal 22. Collector 18*c* is connected through a load resistor 23 and a load supply battery 24 to ground and is also connected to an output terminal 25. A clamp circuit is provided for the collector 18*c* including a diode 26 and a clamping battery 27.

Where the inverter of Fig. 2 is utilized as a driving stage, as in the case of the driving stages 7, 9 and 11 of Fig. 1, the input terminal 19 is grounded and the stage functions as a simple inverter. Briefly, the transistor is normally "on" and is cut off by the application of a positive input signal to the input terminal 22, thereby producing a negative signal at the output terminal 25. For example, the no signal potential at input terminal 22 may be −5 volts, and the signal potential 0 volts, the no signal and signal potentials at output terminal 25 being just the opposite.

In the logical junction stages 13 the inverters are connected as "And Not" circuits of the type described in detail in Fig. 6 of the Bruce et al. application, Serial No. 459,322. The operation is basically the same as in the case of the simple inverter described above, taking into consideration that the input terminal 19, instead of being permanently at 0 volts, now swings between a no signal potential of, for example, −5 volts and a signal potential of 0 volts. The input terminal 22 also swings between the same potentials. However, the signal potential at output terminal 25 is now 0 volts and the no signal potential is −5 volts. Briefly such a circuit produces a signal at the output terminal 25 when a signal (0 volts) is received at the input terminal 19 connected to emitter 18*e* and no signal (−5 volts) is received at the input terminal 22 connected to base 18*b*. Any other combination of signals at input terminals 19 and 22 will result in no signal (−5 volts) at the output terminal 25.

The three driving circuits 7, 9 and 11 respond to signals from three stages, numbered respectively 28, 29 and 30 of a ring circuit, which may be a ring circuit of the type described in the copending application of Thomas E. Wohr, Serial No. 459,471, filed September 30, 1954. Such a circuit produces output signals successively at the output terminals of the ring stages. The duration of the signals from the ring stage outputs is controlled by signals on a line 31 identified as the ring driver line. For example, the ring driver may produce signals at intervals of thirty microseconds. In response to a series of such signals, the number 1 column stage is turned "on" for thirty microseconds, it is then turned "off" and the number 2 stage is turned "on" for thirty microseconds, after which it is turned "off" and number 3 is turned "on" for thirty microseconds. After the third stage turns "off," the first stage turns "on" again and the cycle is repeated endlessly. Consequently, only one of the three column drive lines 8, 10 and 12 is at its "on" potential (−5 volts) at any one time, and in each row, only one junction stage 13 has its input terminal 22 at −5 volts at any one time.

The junction stages 13 have a high base input impedance, even when their input terminals 22 are at −5 volts. Only the one stage 13 of a column whose terminal 19 is at 0 has a low base input impedance. Consequently, the driver stages 7, 9 and 11 only have one junction stage effective as a load at any time, regardless of the number of rows of junction stages.

The driver stages 1, 3 and 5 for the X, Y, and Z rows are emitter followers to the type shown and claimed in the copending application of George D. Bruce, Robert A. Henle and James L. Walsh, Serial No. 459,382, filed September 30, 1954. Such a stage is shown in detail in Fig. 3, and includes a PNP junction transistor 31 having an emitter electrode 31*e*, a base electrode 31*b* and a collector electrode 31*c*. Emitter electrode 31*e* is connected through a load resistor 32 and a load supply battery 33 to ground. Emitter 31*e* is also connected to an output terminal 34. Base electrode 31*b* is connected through a resistor 35 to an input terminal 36. Collector 31*c* is connected through a biasing battery 37 to ground.

Figure 3:
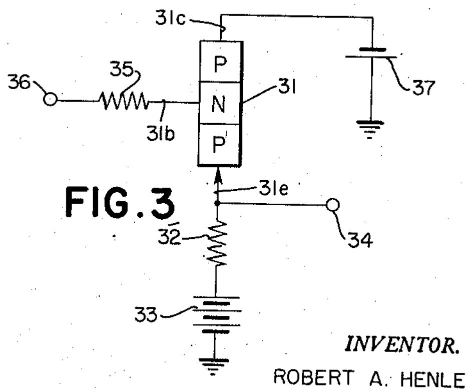
Fig. 3 is a wiring diagram of an emitter follower circuit used in the network of Fig. 1.

The emitter follower of Fig. 3 is always "on," in the sense that it is always conducting current. Upon the appearance of a positive input signal at the terminal 36, the emitter follows the variation in potential of the base, and thereby produces an output signal of the same polarity at the output terminal 34. For example, output terminal 34 may have a no signal potential of −5 volts and a signal potential of 0 volts. This emitter follower is particularly suitable for use in driving low impedance loads. In the present instance, the output terminal 34 of each emitter of the follower circuit is connected to a row drive line and through that line to the parallel emitters of three junction stages 13. The emitter input impedance of one junction stage in the row whose base input (terminal 22) is negative (e. g. −5 volts) is very low, so it may be seen that the load on each of the row drive lines 2, 4 and 6 is well matched by the input impedance of the emitter followers 1, 3 and 5. Furthermore, regardless of the number of stages in a row, the load on the output of each emitter follower is substantially the same, i. e. the load of the one junction stage whose input impedance is low, since that stage effectively shunts the emitter inputs of the other junction stages in the row.

Also, the output impedance of the one junction stage which is turned on is low, so that the junction stages are capable of delivering substantial currents to their respective loads.

The emitter followers 1, 3 and 5 are driven through three successive stages 38, 39 and 40 of a ring circuit, which may be of the type shown and claimed in the Wohr application, Serial No. 459,471, previously mentioned. This ring circuit is driven by a driver stage 41, whose signal impulses may occur at substantially shorter intervals than the signal input pulses on ring drive line 31. Specifically, the signals from the ring driver 41 may typically be a fraction of the duration of the signals of ring driver 31, the denominator of this fraction being equal to the number of the rows and the numerator being 1. There being three rows in this case, the output signals of driver 41 are one-third of the duration of the output signals on drive line 31. If the signals on drive line 31 are thirty microseconds long, then the output signals of driver 41 are ten microseconds long. The drive line 31 may be synchronized, by connecting it to the output of stage 40, so that when ring stage 28 is producing an output signal, ring stages 38, 39 and 40 simultaneously go through a sequence of three output signals. In that way, the column A of the matrix is scanned, producing signals at the respective output terminals AX25, AY25 and AZ25. The columns B and C are then scanned successively.

By reversing the ring driver 41 and drive line 31, it is possible to scan the matrix row by row instead of column by column.

Other circuits for driving the scanning matrix or for producing outputs from selected locations in the matrix may be employed.

While I have shown and described a preferred embodiment of my invention, other modifications thereof will readily occur to those skilled in the art, and I therefore intend my invention to be limited only by the appended claims.

I claim:

A switching network comprising a plurality of junction stages arranged electrically in rows and columns; each said stage comprising a junction transistor, having a collector electrode, an emitter electrode, and a base electrode, a first input terminal directly connected to said emitter electrode, a second input terminal, means including a resistor and a capacitor in parallel connecting said second input terminal to said base electrode, a load resistor and a load supply source of electrical energy connected in series to said collector electrode, and an output terminal directly connected to said collector electrode; a column drive line for each column connected to the first input terminals of each junction stage in the column, a column driving stage for each column drive line, comprising a junction transistor having a collector electrode, an emitter electrode, and a base electrode, means connecting the emitter electrode to ground, an input terminal, means including a resistor and a capacitor in parallel connecting said input terminal to said base electrode, a load resistor and a load supply source of electrical energy connected in series between said collector electrode and ground, and an output terminal connected directly to said collector electrode and to said column drive line; a row drive line for each row connected to the second input terminals of each junction stage in the row, a row driving stage for each row drive line comprising a junction transistor having an emitter electrode, a base electrode and a collector electrode, a biasing source of electrical energy connected between said collector electrode and ground, an input terminal, a resistor connecting said input terminal to said base electrode, a load resistor and a load supply source of electrical energy connected betwen said emitter electrode and ground, and an output terminal connected to said collector electrode and to the row drive line; column selecting means operable to transmit signals to the input terminals of the column driving stages one at a time, and row selecting means operable to transmit signals to the input terminals of the row driving stages one at a time.

References Cited in the file of this patent

UNITED STATES PATENTS

| | | |
|---|---|---|
| 2,465,355 | Cook | Mar. 29, 1949 |
| 2,592,683 | Gray | Apr. 15, 1952 |
| 2,627,039 | MacWilliams | Jan. 27, 1953 |
| 2,718,613 | Harris | Sept. 20, 1955 |